United States Patent
You et al.

(10) Patent No.: US 10,380,610 B2
(45) Date of Patent: Aug. 13, 2019

(54) SOCIAL MEDIA ENRICHMENT FRAMEWORK

(71) Applicant: Oracle International Corporation, Redwood Shores, CA (US)

(72) Inventors: Natalie Shuchyng You, Mountain View, CA (US); Yizhou Jiang, Redwood City, CA (US); Wenhua Li, Palo Alto, CA (US); Dawei Huang, Beijing (CH); Vivek Nama, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 15/385,621

(22) Filed: Dec. 20, 2016

(65) Prior Publication Data

US 2018/0174161 A1 Jun. 21, 2018

(51) Int. Cl.
*G06Q 30/00* (2012.01)
*G06Q 30/02* (2012.01)
*G06Q 50/00* (2012.01)
*G06F 7/02* (2006.01)

(52) U.S. Cl.
CPC ......... *G06Q 30/0201* (2013.01); *G06F 7/026* (2013.01); *G06Q 50/01* (2013.01)

(58) Field of Classification Search
CPC ............ G06F 1/00–21/00; G06Q 10/00–50/00
USPC .............................................. 705/7.11–7.42
See application file for complete search history.

(56) References Cited

U.S. PATENT DOCUMENTS

| | | | |
|---|---|---|---|
| 7,685,575 B1 | 3/2010 | Fareed | |
| 8,230,062 B2 | 7/2012 | Newton | |
| 8,655,938 B1 | 2/2014 | Smith et al. | |
| 8,676,875 B1 * | 3/2014 | Smith | H04L 51/32 705/37 |
| 8,712,953 B2 | 4/2014 | Beringer et al. | |
| 8,856,232 B1 | 10/2014 | Swerdlow et al. | |
| 9,262,517 B2 | 2/2016 | Feng et al. | |
| 9,330,119 B2 * | 5/2016 | Chan | G06F 17/30598 |
| 9,392,049 B2 | 7/2016 | Ennis et al. | |
| 9,436,758 B1 | 9/2016 | Lewis et al. | |

(Continued)

OTHER PUBLICATIONS

The Value of Social Data, Oracle social white paper, Dec. 2013, http://www.oracle-downloads.com/valueofsocial.pdf.

(Continued)

*Primary Examiner* — Alan S Miller
(74) *Attorney, Agent, or Firm* — Invoke

(57) ABSTRACT

A social media enrichment framework is described herein. In one or more embodiments, the framework is configured to store a set of interface endpoints for accessing different sources of analytic metadata. The framework further stores a set of mappings between social media object types and interface endpoints. Responsive to receiving a social media object having a particular social media object type, the framework identifies, within the set of mappings, a mapping between the particular social media object type and at least one interface endpoint in the set of interface endpoints. The framework then obtains, from one or more sources using the at least one interface endpoint, a set of one or more metrics relevant to the social media object and stores the set of one or more metrics in association with the social media object.

20 Claims, 9 Drawing Sheets

(56) References Cited

U.S. PATENT DOCUMENTS

| | | | |
|---|---|---|---|
| 9,442,984 B2 | 9/2016 | Smith et al. | |
| 9,536,269 B2 | 1/2017 | Chang et al. | |
| 9,633,399 B2 | 4/2017 | George et al. | |
| 10,019,988 B1 | 7/2018 | Chan et al. | |
| 2007/0265864 A1* | 11/2007 | Chess | G06Q 10/00 705/319 |
| 2009/0106603 A1 | 4/2009 | Dilman et al. | |
| 2009/0319288 A1* | 12/2009 | Slaney | G06Q 10/10 705/1.1 |
| 2012/0046936 A1 | 2/2012 | Kandekar et al. | |
| 2012/0158476 A1 | 6/2012 | Neystadt et al. | |
| 2012/0185735 A1 | 7/2012 | Sambamurthy et al. | |
| 2012/0290562 A1* | 11/2012 | Wable | G06F 17/30867 707/722 |
| 2012/0296845 A1 | 11/2012 | Andrews et al. | |
| 2013/0073378 A1 | 3/2013 | Naveh et al. | |
| 2013/0166379 A1 | 6/2013 | Ehindero et al. | |
| 2013/0290458 A1 | 10/2013 | Morris et al. | |
| 2013/0325550 A1 | 12/2013 | Varghese et al. | |
| 2014/0006977 A1 | 1/2014 | Adams | |
| 2014/0074551 A1 | 3/2014 | Setayesh et al. | |
| 2014/0074844 A1 | 3/2014 | Subramanian et al. | |
| 2014/0180788 A1 | 6/2014 | George et al. | |
| 2014/0188863 A1 | 7/2014 | Grauman et al. | |
| 2014/0214495 A1* | 7/2014 | Kutty et al. | G06Q 10/0637 705/7.36 |
| 2014/0222604 A1 | 8/2014 | Yellapragada | |
| 2014/0280625 A1* | 9/2014 | Byrd Vallieres de St. Real | H04L 67/22 709/206 |
| 2015/0020086 A1 | 1/2015 | Chen et al. | |
| 2015/0066788 A1 | 3/2015 | Tebbe | |
| 2015/0169587 A1 | 6/2015 | Silverman et al. | |
| 2016/0004529 A1 | 1/2016 | Xia et al. | |
| 2016/0063442 A1 | 3/2016 | Bennett et al. | |
| 2016/0148325 A1 | 5/2016 | Dhawan et al. | |
| 2017/0053298 A1 | 2/2017 | Sun et al. | |
| 2017/0061528 A1 | 3/2017 | Arora et al. | |
| 2017/0132230 A1 | 5/2017 | Muralidhar et al. | |
| 2018/0173713 A1 | 6/2018 | Lawbaugh | |

OTHER PUBLICATIONS

MDM Driven Data Enrichment, IBM InfoSphere Master D ata Management, Version 11.3, Mar. 16, 2016, https://www.ibm.com/support/knowledgecenter/api/content/nl/en-us/SSWSR9_11.3.0/com.ibm.swg.im.mdmhs.sdfcintegration.doc/topics/c_mdmdrivenenrichment.html.

Human Data platform DataSift, https://datasift.com/platform/#normalize.

Guo et al., Linking Tweets to News a Framework to Enrich Short Text Data in Social Media, Proceedings of the 51st Annual Meeting of the Association for Computational Linguistics (vol. 1: Long Papers), Aug. 2013.

Gomadam et al., Data Enrichment Using Data Sources on the Web, AAAI Technical Report SS-12-04, Intelligent Web Services Meet Social Computing, pp. 34-38.

Gnip—Data collector, https://gnip.com/realtime/data-collector/, Mar. 18, 2016.

Data Collector Overview, http://support.gnip.com/apis/data_collector/overview.html.

Case Study: MutualMind, How MutualMind Accelerated the Market Launch of Its Cutting Edge Social Listening, Management and Engagement Solution.

* cited by examiner

| API_ENDPOINTS | | | | | | |
|---|---|---|---|---|---|---|
| ID | System | Name | API | Authorization Data | Request Format | Response Format |
| 1 | Twitter_api | msg_enrich | URL1 | Authorization Method, Credentials | HTTP header values, | Attribute Mapping |
| 2 | BlueKai_api | demo_enrich | URL2 | | ,,, | .. |
| 3 | BlueKai_api | sales_enrich | URL3 | | ... | ... |
| 4 | ... | ... | ... | | ... | ... |

FIG. 2B

| ATTRIBUTES | | | | | |
|---|---|---|---|---|---|
| ID | API Endpoint | Attribute Name | From | To | Data Type |
| 1 | 1 | "attribute_1" | "id" | "message_id" | integer |
| 2 | 1 | "attribute_2" | "sentiment" | "level" | integer |
| 3 | ... | ... | ... | ... | ... |

| ENRICHED DATA | | | | | |
|---|---|---|---|---|---|
| ID | API Endpoint | Object | Attribute 1 | Attribute 2 | ... |
| 1 | 1 | 1 | 1 | -4 | ... |
| 2 | 1 | 2 | 1 | 10 | ... |
| 3 | ... | ... | ... | ... | ... |

FIG. 4B

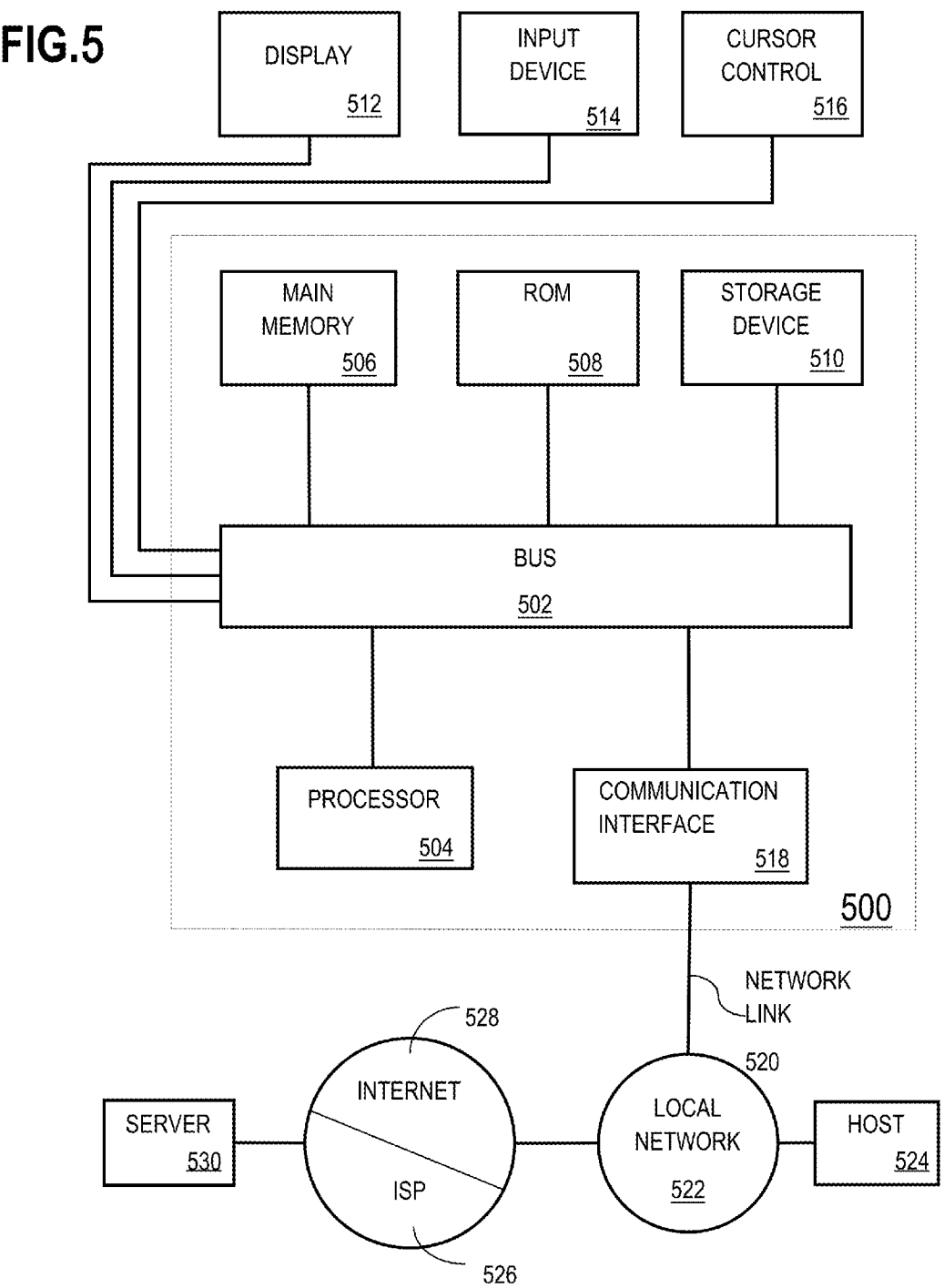

SOCIAL MEDIA ENRICHMENT FRAMEWORK

CROSS-CITE REFERENCE

This application is related to U.S. Provisional Patent Appl. No. 62/301,584, entitled "CONDITIONAL AUTOMATIC SOCIAL POSTS", filed Feb. 29, 2016, the entire contents of which are incorporated by reference as if set forth in their entirety.

FIELD OF THE DISCLOSURE

The present disclosure relates, generally, to social relationship management (SRM) systems and, more specifically, to computer-implemented techniques for extracting and processing enrichment data for objects obtained through various social communication channels.

BACKGROUND

A growing number of businesses and other entities are using social media platforms to engage with customers and other consumers of goods and services. Social customer service (SCS) personnel may be responsible for creating, promoting, developing, or encouraging positive experiences, which involve leveraging social media platforms to proactively enhance the consumer experience, and/or addressing, resolving, and controlling the exposure of negative experiences, such as resolving consumer problems. Effective SCS interactions with consumers may help improve an organization's brand and image, while ineffective interactions may have little effect or even be damaging. Even outside the context of business, individuals may find themselves encouraging positive social experiences and discouraging negative social experiences in order to enhance their social environments and improve their social images.

Social relationship management (SRM) systems are applications through which organizations may manage SCS interactions with former, current, and future customers. SRM systems typically integrate a variety of components into a unified service to facilitate engagement and management of relationships with consumers over social media channels. Example SRM components may include, without limitation, a social listening component that monitors posts on social media channels (such as Facebook, Twitter, LinkedIn, SnapChat, Periscope, Google Plus, Yelp, WeChat, FourSquare, Instagram, Pinterest, Tumblr, WhatsApp, and/or WordPress, etc.) for relevant content, a social analytic component that analyzes relevant posts detected on social media channels, and a publishing component that allows SRM users ("SRM personnel") to post content on one or multiple social media channels through a single interface. By integrating these components into a single unified service, businesses may quickly react to and provide relevant content through various social media channels.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2B illustrates an example data structure that defines a set of API endpoints in accordance with one or more embodiments;

FIG. 2C illustrates an example data structure that maps values within a response message to attribute values stored in association with an object in accordance with one or more embodiments;

FIG. 4B illustrates an example data structure that maps enriched attributes to an object in accordance with one or more embodiments; and FIG. 5 illustrates an example computer system upon which one or more embodiments may be implemented.

DETAILED DESCRIPTION

Figure 1:
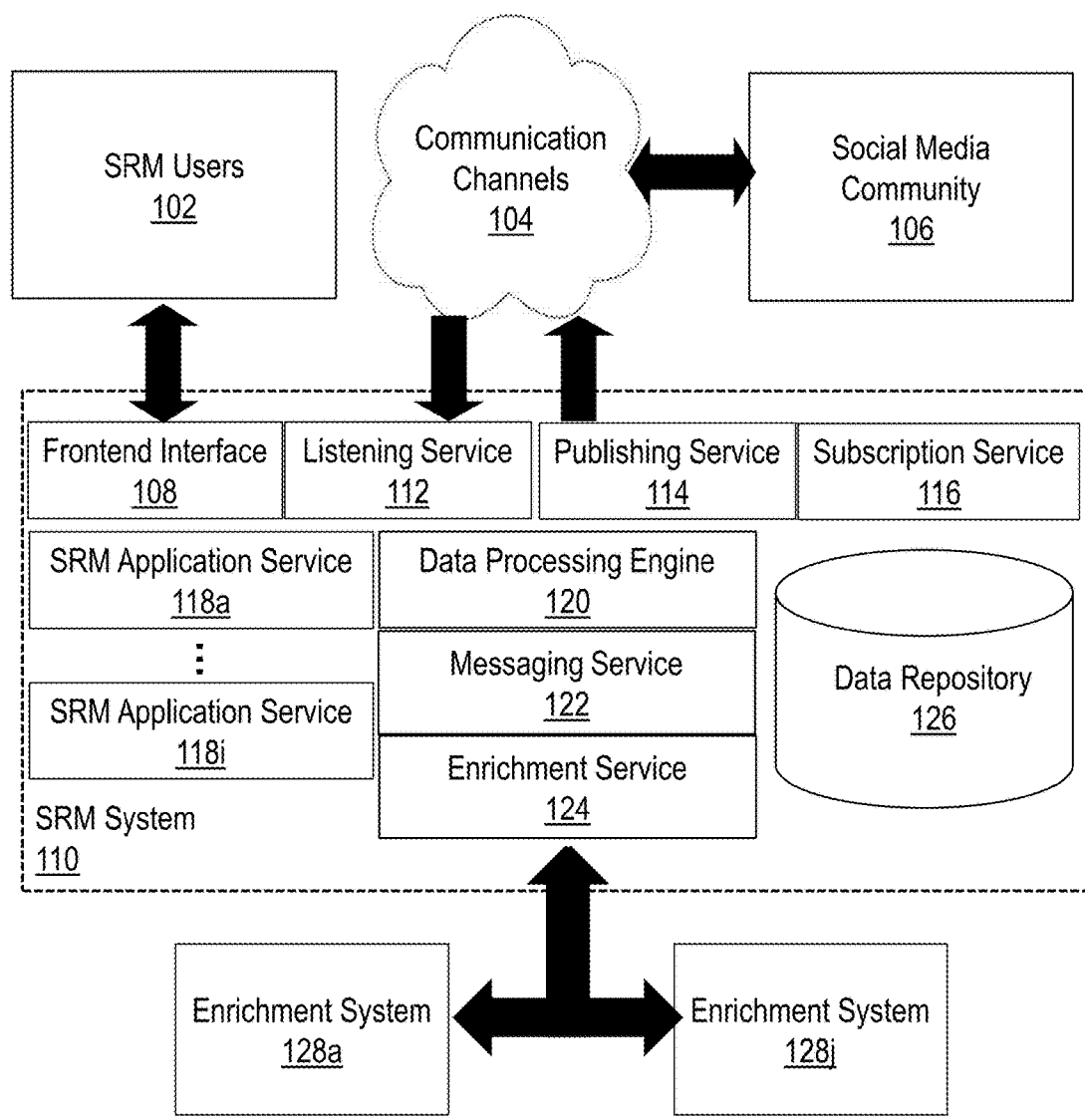
FIG. 1 illustrates an example social relationship management system comprising an enrichment framework in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PLUGGABLE SOURCE INTEGRATION
4. OBJECT REGISTRATION
5. OBJECT ENRICHMENT
6. ANALYTIC DATA PROCESSING
7. HARDWARE OVERVIEW
8. MISCELLANEOUS; EXTENSIONS

1. General Overview

Social relationship management (SRM) systems may benefit from analytic metadata provided from social networks and/or other third-party enrichment systems. Various social networks and third-party enrichment systems are configured to implement specialized algorithms to analyze raw data and provide structured insights about the data. For example, one third-party enrichment system may extract a level of sentiment exhibited by a social media user or set of users in response to a social media post. Another analytic may provide demographic and/or other information about social media users that engage with a post. Other third party enrichment systems may provide various metrics about the social media posts that may be useful to analyze. SRM applications may leverage such insights to improve the effectiveness of SCS interactions.

The dynamic nature of third-party enrichment systems introduces complexity to third-party analytic integration with SRM systems. New third-party enrichment systems and analytics may be released over time while existing third-party systems are subject to change. In addition, different users of an SRM application may be interested in different analytics and may be registered with different third-party analytic systems. As a result, SRM system providers may not be able to anticipate the sources of analytic metadata and the types of analytic metadata that will be used in conjunction with SRM applications.

Based on the foregoing, SRM system providers may push the responsibility of integrating third-party analytics with SRM systems to end users. As a result, SRM users may end up manually inputting analytic metadata after it is obtained from the third-party system or creating custom scripts to extract and load the analytic metadata into an SRM application. Manual data input does not require any coding on the part of the SRM user. However, manual data input may involve significant amounts of data entry, which may be cumbersome and prone to error. Custom scripts, on the other hand, involve coding, increasing complexity to the end user. Further, custom scripts may be rendered unusable and require updates if the third-party enrichment systems change.

Techniques described herein provide for a social media enrichment framework through which different sources of analytic metadata may be integrated within an SRM system. In one or more embodiments, the framework allows for pluggable integration of third-party sources of analytic metadata. Each third-party source may be seamlessly plugged into or disconnected from an SRM application. New sources of analytic metadata may also be plugged into an SRM application with little to no coding on the part of an end user.

When a source is plugged into an SRM application, endpoint data for accessing the source is stored in accordance with one or more embodiments. An endpoint for a source may include various data for accessing an application programming interface (API) associated with the source. For example, endpoint data may include, but is not limited to, Uniform Resource Locators (URLs), access credentials, request formatting information, and response processing information. Endpoint information may be updated, migrated, and/or added to accommodate new and evolving third-party enrichment sources of analytic metadata.

SRM applications may access enriched data via the stored endpoints in accordance with one or more embodiments. For example, an SRM application may submit a request to obtain enrichment data for a particular object. An "object" in this context may include, but is not limited to, a social media handle, a social media post, a tweet, a private message, and/or any other social media communication. In response to the request, the enrichment framework may determine how to generate an API request (or set of API requests) for each source using the API endpoint data. The framework may then send one or more API requests to respective sources to obtain analytic metadata from the sources.

In one or more embodiments, the enrichment framework maintains a mapping between analytic metadata provided by a plugged-in source and one or more attributes. For example, if a source responds to an API request with a set of metrics about an object, each metric may be mapped to a separate attribute associated with an SRM application. The SRM application may then process the analytic metadata to gain actionable insights about objects and/or perform actions based on the metrics.

In one or more embodiments, the enrichment framework registers object and/or object types for enrichment. During registration, the enrichment framework maps the object or object type to one or more endpoints. A given object or object type may be mapped to a single endpoint or multiple source endpoints. For example, the enrichment framework may store a tuple that associates a particular object or object type with a set of one or more sources. The tuple data structure may be processed during application runtime to obtain enrichment data based on the object-to-source endpoint mapping. Additionally or alternatively, a given source endpoint may be mapped to a single or multiple objects/object types. For instance, tweets, facebook comments, and/or other object types may be mapped to the same source endpoint that extracts one or more metrics about the objects.

When an object is registered, the enrichment framework is configured to listen for events that trigger enrichment of the object in accordance with one or more embodiments. For example, the enrichment framework may monitor for content additions, updates, or other actions associated with the object. In response to detecting a triggering event, the enrichment framework selects the API endpoints and sources that are mapped to the object. Based on the endpoint data, the enrichment framework sends one or more API requests to the respective sources to obtain analytic metadata for the object.

In one or more embodiments, the enrichment framework is configured to normalize metric data obtained from various sources. Data normalization allows SRM applications to consistently process, combine, and present metrics that may have varying units, datatypes, and meanings. For example, a third-party system may be configured to measure a level of sentiment for a social media post on a scale of 0 to 100. The enrichment framework may convert the metric to a scale of 0 to 1 or some other scale relevant to an SRM application. The SRM application may use the normalized data to perform further analytics on an object.

In one or more embodiments, the enrichment framework is configured to apply a set of weights to metrics obtained from third-party sources. The weights may be associated with object, object types, and/or sources, depending on the particular implementation. For example, one source of data may be given greater weight than another source of data to indicate a higher degree of reliability and/or relevance of the source.

Weights may be further assigned on a per metric basis. For example, a metric measuring a level of sentiment may be assigned a greater or lesser weight than a metric measuring a level of engagement depending on the relevance of the metrics to a particular SRM application. The weights may be applied to normalize and/or further analyze enriched data. The weights provide flexibility in how SRM applications interpret, combine, and process metrics obtained from third-party sources.

2. Architectural Overview

In one or more embodiments, a social media enrichment framework is built using a multilayered architecture that includes, but is not limited to, a frontend for interfacing with users and a backend for retrieving analytic metadata for one or more SRM applications. Each layer of the social media enrichment framework represents a separate logical and/or physical structure that provides a distinct set of functions within the architecture. Each layer may be executed on a single host machine or distributed across several host machines. Additionally or alternatively, multiple layers may be executed on the same host machine or on different host machines. The social media enrichment framework may be deployed locally, within a cloud environment and/or distributed across multiple cloud environments.

In one or more embodiments, the frontend of the social media enrichment framework defines an interface for interacting with a user. The interface may include, but is not limited to an application programming interface (API), a command-line interface (CLI), and/or a graphical user interface (GUI). A user of an SRM may submit commands/requests, navigate GUI objects, receive responses, and/or otherwise interact with the enrichment framework through the frontend. A "user" in this context may be a human user (such as a developer, system administrator, or other personnel) or a separate application (such as an SRM application).

In one or more embodiments, the frontend includes an interface for integrating external sources of analytic data with an SRM system. An "external" source in this context is an application or service that logically and/or physically belongs to a different system. One example of an external source is referred to as a third-party source, which is an application or service provided by a different service provider than the SRM system. In other cases, external sources may be provided by separate applications or systems developed by the same provider as the SRM system. Example integration functions available through the frontend may include, but are not limited to, (a) defining API endpoints for external sources to "plug-in" to the SRM system; (b) mapping objects and object types to API endpoints for plugged-in sources; (c) mapping analytic metadata to object attributes; (d) defining weights for different objects, object types, sources, and/or metrics, and (e) defining user-provided formulas/logic for processing analytic metadata returned by external sources.

In one or more embodiments, the backend of the enrichment framework is configured to obtain enriched data from plugged-in sources. The backend may determine which analytic metadata to obtain based on defined mappings between object/object types and sources, as described in further detail below. Analytic metadata may be obtained on demand, such as in response to a request to an SRM application, and/or asynchronously in response to detecting a triggering event.

FIG. 1 depicts an example SRM system architecture including a social media enrichment framework, in accordance with one or more embodiments. Referring to FIG. 1, SRM system 110 comprises frontend interface 108, listening service 112, publishing service 114, subscription service 116, SRM application services 118a-i, data processing engine 120, messaging service 122, enrichment service 124, and data repository 126. A "service" as used herein refers to a set of one or more processes, threads, or other logic executing on one or more computing devices that provide a certain function or set of functions during execution. In one or more embodiments, the services are integrated into a unified application, cloud or network service. In other embodiments, one or more of the services may be part of a separate application, cloud, or network service. Operations described with respect to one component may instead be performed by another component, depending on the particular implementation.

Frontend interface 108 provides a user interface through which SRM user(s) 102 may interact with SRM system 110. SRM user(s) 102 in this context may include human users, such as marketing specialists, system managers, etc., or other applications and services. In one or more embodiments, frontend interface 102 may expose a GUI, API, and/or CLI for configuring the interface between enrichment service 124 and enrichment systems 128a-j. For instance, a user may create (e.g., using a set of menus, windows, and/or other GUI objects) a configuration file that defines source endpoints, object-to-source mappings/tuples, and/or metric weights as described in further detail below. In addition or as an alternative, frontend interface 108 may provide an interface for defining custom formulas and/or other logic for processing metric data. For example, an SRM user may include a formula for combining different metrics obtained from enrichment systems 128a-i into a single object attribute. Other forms of user-provided logic may also be defined to process enriched data for consumption by SRM application services 118a-i.

SRM application services 118a-i represent one or more processes implementing application logic (i.e., the application layer) for one or more SRM applications. The SRM applications that are deployed may vary from implementation to implementation. An example SRM application is a conditional automated social post application such as described in U.S. Provisional Patent Appl. No. 62/301,584, entitled "CONDITIONAL AUTOMATIC SOCIAL POSTS", previously incorporated by reference. In addition or as an alternative, SRM application services 118a-i may support other SRM applications. Examples may include, but are not limited to cloud-based analytics, social content marketing, community engagement, content creation, and/or automated service applications.

Listening service 112 monitors communication channels 104 for content of interest (herein referred to as "target" content). In one or more embodiments, target content includes posts that reference or are otherwise associated with a particular entity, such as an organization, brand, product, or individual. As an example, listening service 112 may be configured to monitor, in real time, for social posts within a threshold period of time that reference a particular brand or product. As another example, listening service 112 may be configured to monitor for recent posts that relate to a particular event or that contain a particular hashtag. As another example, listening service 112 may be configured to search for image or video content that references a particular topic. The target social media content for which social listening service 112 may vary from SRM application to SRM application and may be configurable by SRM users 102. When new target content is detected, enrichment data for the content may be obtained as described in further detail below.

In one or more embodiments, communication channels 104 include one or more social media platforms through which social media community 106 publish social media content. Example social media channels may include, without limitation, blogs, micro-blogs, social networking sites, video sharing websites, photo sharing websites, forums, e-commerce sites that allow users to post company or product reviews or product-specific information, and websites that allow collaborative modification of content. More specific examples of social media channels include Facebook, Twitter, LinkedIn, SnapChat, Periscope, Google Plus, Yelp, WeChat, FourSquare, Instagram, Pinterest, Tumblr, WhatsApp, WordPress, eBay, Amazon Shopping, CraigsList, etc.

In one or more embodiments, communication channels 104 include direct and/or indirect interactions with consumer(s) outside of a social platform. As an example, communication channels 104 may include, without limitation, email communications, direct messages, e-commerce interactions, web marketing interactions, etc. In the context of e-commerce interaction, listening service 112 may monitor interactions associated with particular target content such as product views, purchase information, and other data provided via hypertext transfer protocol (HTTP) cookies collected from one or more e-commerce sites. In the context of a web marketing platform, listening service 112 may monitor interactions with published web campaigns, such as metrics identifying view-through rates, click-through rates, purchase rates, and/or other campaign data gathered from users interacting with campaign communications for a particular online marketing campaign.

In order to monitor for target content, listening service 112 may crawl, scan, or otherwise search one or more servers for posts, stored cookies, and/or other sources of content. If target content is detected within a communication, listening service 112 may download the communication or otherwise extract the target content from the communication channel and store the communication/target content within data repository 126. The communications and target content may be sorted and indexed to facilitate analysis.

Social media community 106 interacts with communication channels 104, including social media platforms, through one or more data communication networks such as the Internet. Social media community 106 may include current, former, and potential future consumers of goods/services provided by an organization that engages in SCS and/or social marketing through SRM system 110.

Publishing service 114 posts or otherwise publishes messages for SRM applications on communication channels 104. Publishing service 114 may post messages publicly such that the message is available for viewing to all social media users of a particular social media channel, semipublicly on a channel that is restricted to a group of users, or privately (e.g., via email or direct message) to a targeted set of users or to a specific user. Published posts may include text, images, audio content, video content, or some combination thereof to convey information to consumers via communication channels 104. Publishing service 114 may publish a post on a single social media channel, across multiple social media channels, via a direct or group email, or through any other network channel.

SRM system 110 includes data repository 126 for storing data for one or more components of SRM system 110. Data repository 126 may be any type of storage unit and/or device (e.g., a file system, database, collection of tables, or any other storage mechanism) for storing data. Further, data repository 126 may include multiple different storage units and/or devices. The multiple different storage units and/or devices may or may not be of the same type or located at the same physical site. Further, data repository 126 may be implemented or may execute on the same or separate computing systems as other components of SRM system 100. Data repository 126 may be communicatively coupled to other components of SRM system 100 via a direct connection or via a network.

In one or more embodiments, data repository 126 stores one or more configuration files. As previously indicated, a configuration file stores data for integrating sources with SRM system 110. A configuration file may define source endpoints, object-to-source mappings/tuples, and/or metric weights as described in further detail below.

Additionally or alternatively, data repository 126 may store enrichment data for a social media object. Enrichment data may include, but is not limited to, metrics and/or other attributes associated with a data object. More specifically, enrichment data may include geographic information (e.g., zip codes, address, global positioning information), behavioral information (e.g., communication channel preferences, purchase history), demographic information (e.g., gender, income, education), community information (e.g., community preferences for an associated group), sentiment (e.g., whether a post expresses a positive or negative sentiment), engagement information (e.g., number of retweets, number of replies, number of likes), etc. Enrichment data may be obtained through internal sources that are a part of SRM system 110 and/or external sources that are plugged into SRM system 110.

The backend layer of SRM system 110 includes enrichment service 124, which manages integration of enrichment systems 128a-j with SRM application services 118a-i. For example, enrichment service 124 may monitor for triggering events and/or request to obtain enriched data. In response to a triggering event or a request to enrich an object, enrichment system 128a-j determines which of enrichment systems 128a-j to access and how to obtain enrichment data for the object. Enrichment service 124 may select the enrichment systems and corresponding APIs to invoke based on the configuration data stored in data repository 126.

Enrichment systems 128a-j are external sources of enrichment data that are integrated into SRM system 110 through the enrichment framework. In one or more embodiments, enrichment systems 128a-j may include one or more of communication channels 104. For example, listening service 104 may monitor Twitter for target tweets. Enrichment service 124 may also access Twitter for enrichment data about a particular tweet (or other social media object). Thus, a social media platform may serve as both a communication channel and a source of analytic data. In other embodiments, enrichment systems 128a-j may include sources of analytic metadata that are not included in communication channels 104. As an example, marketing cloud platforms, such as BlueKai, may be accessed to obtain metrics about a target audience for a social media post, but may not be monitored by listening service 104.

The backend layer of SRM system 110 further includes messaging service 122, which provides an interface between SRM applications and enrichment service 124. In one or more embodiments, messaging service 122 includes a publisher/subscriber messaging sub-system running as a set of one or more background processes. Messaging service 122 may listen for requests from the SRM application to obtain enriched data and publish the enriched data when returned by enrichment service 124. On the other hand, the SRM application may listen to messaging service 122 for newly enriched data.

The backend layer of SRM system 110 further includes data processing engine 120 for performing internal data processing of enriched data before consumption by an SRM application. For example, data processing engine 120 may perform derivations, normalize data, combine metrics, and/or apply user-provided logic to metrics collected from different sources.

3. Pluggable Source Integration

In one or more embodiments, sources are integrated with an SRM application by defining and storing source endpoints. A source endpoint includes a set of data that may be used to access the source to obtain enrichment data. For example, a source endpoint may include parameters for (a) invoking a source's API (such as a representational state transfer (RESTful) or other web services API); (b) authenticating with the source; and/or (c) processing response messages received by the source. Enrichment service 124 may access the source endpoint data to determine how to call the APIs of enrichment systems 128*a-j* and obtain enrichment data for an object as described in further detail below.

The external sources that are plugged in to SRM system 110 may change over time. New sources may be integrated by defining endpoint parameters to access the source. The parameters may be defined by a cloud administrator, SRM user, subject matter expert, or some other user depending on the particular implementation. If there are changes to an existing source (e.g., the API changes), then the endpoint parameters may be updated accordingly or the source may be unplugged from SRM system 110.

In one or more embodiments, SRM system 110 maintains a set of configuration data for the plugged-in sources. The configuration data associated with a given source may include, but is not limited to, (a) endpoint data for the source; (b) a mapping between the source and SRM system objects or object types; and/or (c) a mapping between enrichment data obtained from the source. The configuration data may be stored in one or more tables, configuration files, and/or other data objects within data repository 126.

Figure 2A:
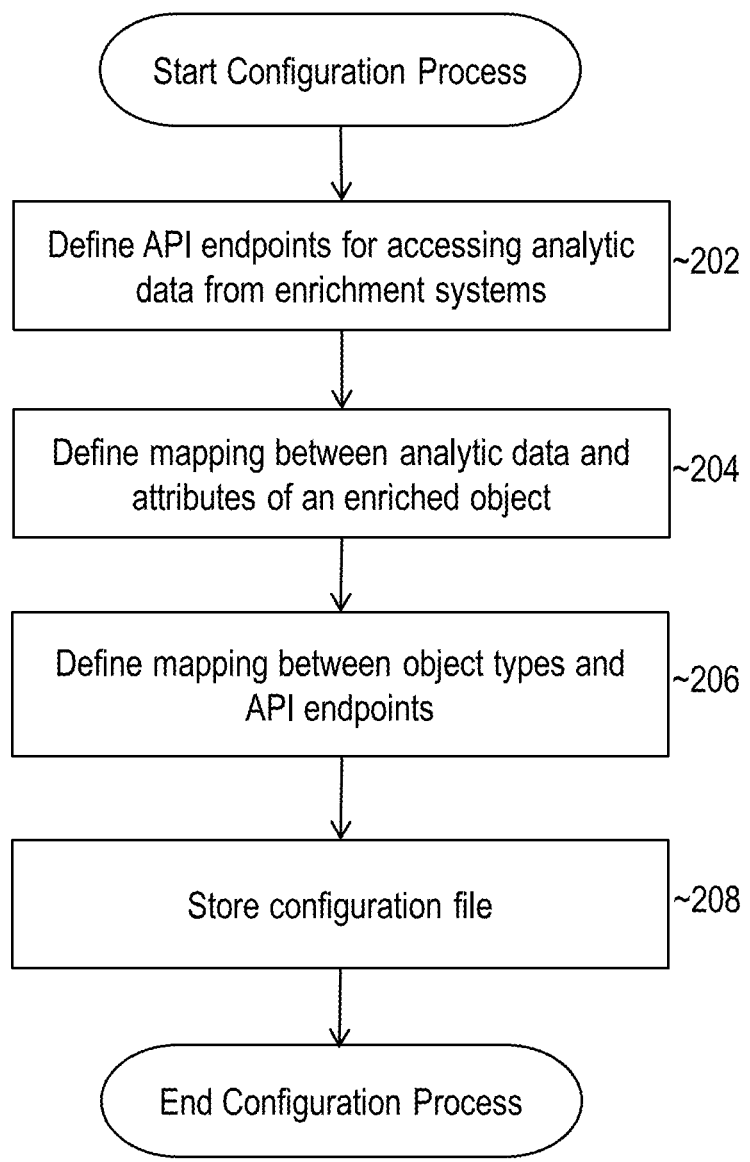
FIG. 2A illustrates an example set of operations for generating a set of configuration data for pluggable sources in accordance with one or more embodiments.

FIG. 2A illustrates an example set of operations for generating a set of configuration data for pluggable sources in accordance with one or more embodiments. The set of operations include defining a set of API endpoints for accessing analytic metadata from enrichment systems 128*a-j* (Operation 202). As previously indicated, the API endpoints may include but is not limited to, URLs for calling the enrichment system API, access credentials for authenticating with an enrichment system, request formatting information providing parameters for formulating API requests, and response format information providing instructions on how to process responses from an enrichment system.

FIG. 2B illustrates example data structure 210 that defines a set of API endpoints in accordance with one or more embodiments. Data structure 210 is a database table comprising a set of rows representing different endpoints and a set of column representing different endpoint attributes. The API endpoint attributes may include, but are not limited to one or more of the following:

ID—This field stores a unique identifier for the API endpoint. The ID depicted in the example is a sequence of integer values. However, other values may be assigned as unique identifiers depending on the particular implementation.

System—This field stores a name of the source that is called when the API endpoint is invoked. Different APIs may be associated with the same source system. For example, the first API endpoint obtains enriched data from Twitter, and the next two APIs both obtain enriched data from BlueKai.

Name—This field stores the name of the enrichment system's API. As previously mentioned, different system's may have separate APIs for obtaining different types of enrichment data. For instance, BlueKai may have one API entitled "demo_enrich" for obtaining demographic information associated with an object and "sale_enrich" for obtaining sales information associated with an object.

API—This field stores a URL for calling a RESTful API to obtain enrichment data.

Authorization Data—This field stores information identifying the authorization method. Example authorization methods may include, but are not limited to Basic Auth, Oauth 1.0, Oauth 2.0, and No Auth. This field or a different field may further store authentication credentials depending on the authorization method. For instance, the field may store usernames, passwords, digital certificates, private keys, public keys, and/or other authentication tokens. An authentication callback URL may also be stored if tokens and/or secrets are exchanged during the authentication method.

Request format—This attribute stores parameters for generating a request for enrichment data. For example, the attribute may store a set of HTTP header values for interfacing with the external source. An HTTP request may then be generated and sent to the URL for the source's RESTful API.

Response format—This attribute defines parameters for parsing the response. For example, the response format may identify where the enriched data of interest resides in a message returned by the enrichment system. the response format may define which metrics to extract a sample response format may be defined as {"messages"; [{"id":"message_id}, . . . ]}. This response format maps the value "id" in the response message to the attribute "message_id" for an enriched object.

The endpoint parameters may be defined and updated without any change to the underlying source code of SRM system 110. For example, if the URL, authorization method, response format, or any other parameters change, the corresponding fields may be updated within the configuration data. This allows SRM applications to continuing obtaining enrichment data from the external source without incurring the overhead of changes to the underlying source code.

Referring again to FIG. 2A, the set of operations includes defining a mapping between analytic metadata returned by a source and attributes of an enriched object (Operation 204). The mapping information may be stored in the response format field, such as previously described. Additionally or alternatively, the mapping data may be stored in a separate data structure. The attribute mapping allows enrichment service 124 to determine how to process analytic metadata included in API responses.

In the example above, the mapping information is defined as {"messages"; [{"id":"message_id}, . . . ]}. Enrichment service 124 may use this mapping to determine how to parse a response and map analytic metadata contained therein to object attributes. For instance, a sample response may be received as follows: {"messages":[{"id": 1, "sentiment": 1}, {"id": 2, "sentiment": -4}{"id": 3, "sentiment": 10}]}. The sample parsed response, ignoring the sentiment metric, may be generated as follows: messages=[{message_id: 1}, {message_id: 2}, {message_id 3}]. Thus, each "id" value included in the response is mapped to the "message_id" attribute for an object.

FIG. 2C illustrates example data structure 220 that maps values within a response message to attribute values stored in association with an object in accordance with one or more embodiments. Data structure 220 is a database table comprising a set of rows representing different attributes and a set of column defining the mapping parameters. The columns include an "ID" field that uniquely identifies the row of an attribute, an "API Endpoint" field that indicates the API endpoint from which the attribute is obtained, an "Attribute Name" field that defines a name for the attribute, a "From" field that identifies the source data to map to the attribute, a "to" field that identifies a destination value for storing the attribute data, and a data type for classifying the destination value based on how an SRM application intends to use the value.

Referring again to FIG. 2A, the set of operations further includes defining a mapping between objects and/or object type (Operation 206). As previously indicated object types may be mapped to a single or multiple source endpoints. In one or more embodiments, mappings are defined using tuples as follows: {object type, source endpoint 1, source endpoint 2, . . . }. The mappings may vary based between different object types and SRM applications. Further, the mappings may be changed before, during or after SRM application runtime to modify the enriched data that is obtained for objects of a given type.

Figure 2D:
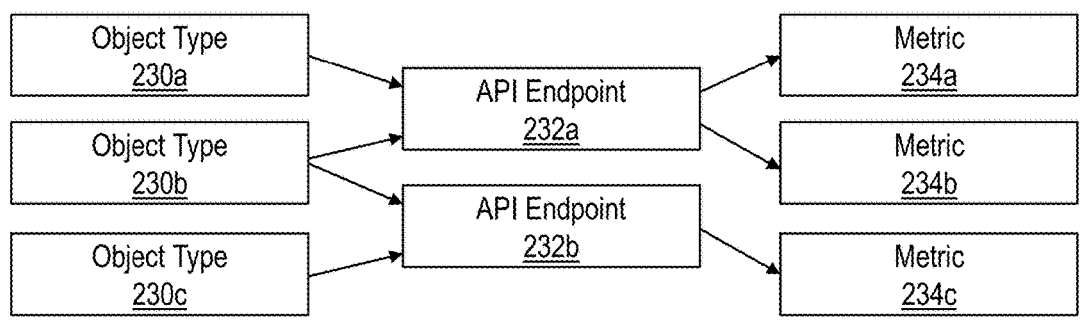
FIG. 2D illustrates an example mapping between object types, endpoints and metrics in accordance with one or more embodiments.

FIG. 2D illustrates an example mapping between object types, endpoints and metrics in accordance with one or more embodiments. As illustrated, object types 230a-c are mapped to different API endpoints (such as API endpoints 232a-b). Each API endpoint is mapped to one or more metrics (such as metrics 234a-c). Thus, the mapping data may be used to determine which APIs to call and which metrics to obtain for objects of varying types. For example, a tweet may result in one set of API endpoints being invoked to obtain a set of metrics about the tweet. A post on Pinterest may invoke a different set of API endpoints to obtain a different set of metrics. Other metrics may be mapped to the same and/or different API endpoints, thereby providing flexibility in how sources are plugged into SRM system 110.

4. Object Registration

In one or more embodiments, users may register individual objects, groups of objects, and/or object types for enrichment by the framework. For example, users may register an individual tweet, a group of tweets, or all incoming objects that have an object type matching "tweet". In other examples, facebook messages, blog posts, social media handles, etc. may be registered individually, in groups, or by object type.

Figure 3A:
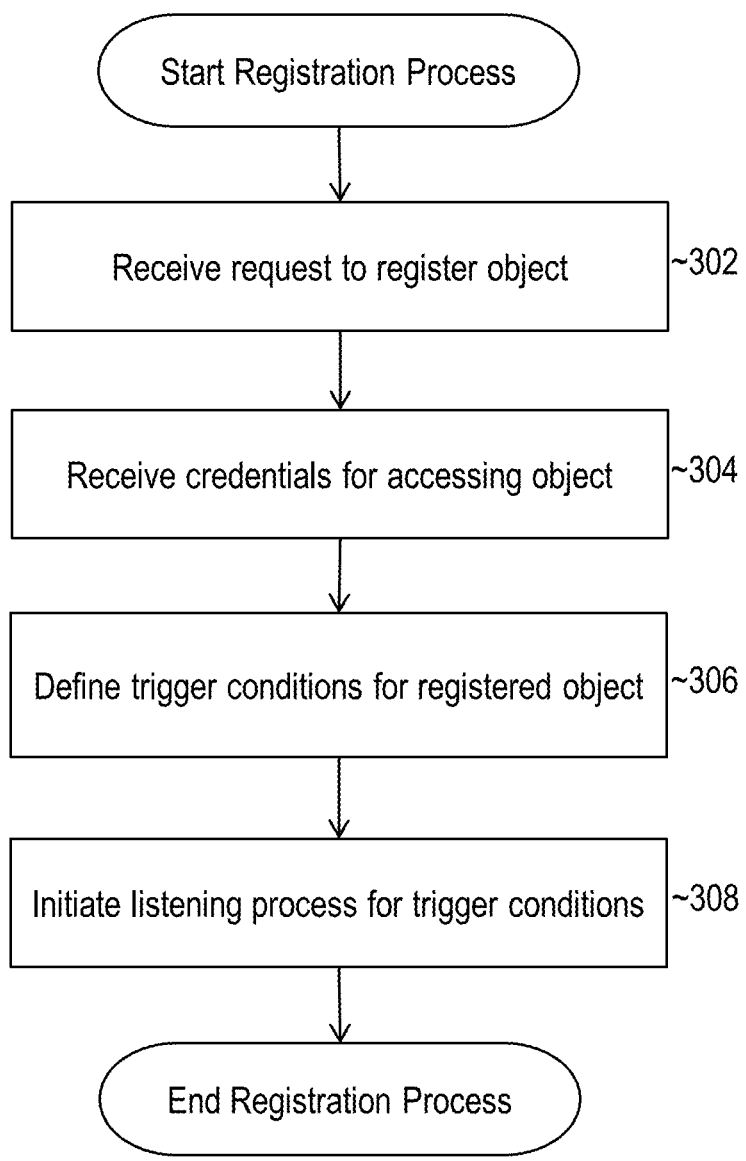
FIG. 3A illustrates an example set of operations for registering objects for enrichment in accordance with one or more embodiments.

FIG. 3A illustrates an example set of operations for registering objects for enrichment in accordance with one or more embodiments. The set of operations include receiving a request to register an object (or object type) for enrichment (Operation 302). In one or more embodiments, the request may be submitted using a drag-and-drop interface. For example, a user may select a GUI object representing a tweet, facebook message, or other social media object and drag the object to an enrichment object. The user may then drop the social media object to obtain enrichment data for the object. In other embodiments, the user may submit registration requests through other GUI interfaces, CLIs, and/or APIs.

The set of operations further includes receiving credentials for accessing the data object (Operation 304). For example, a username, password, shared secret, and/or any other authentication tokens may be received to enable access to the object. The credentials may be stored as in a set of registration data maintained for the object.

The set of operations further includes defining a set of trigger conditions for obtaining enriched data (Operation 306). In one or more embodiments, a trigger may be defined on a database table that stores content for a social media object. If content is added, changed, and/or otherwise updated in the database table, then the trigger is activated to obtain enrichment data for the object. In other embodiments, the trigger conditions may be defined based on any other events and/or combination of events detected by SRM system 110 on communication channels 104. For example, a trigger may activate if a social media post receives a "like" or "dislike", receives a new response message, is shared/retweeted, etc.

Once the set of registration data has been defined, the set of operations initiates a listening process to detect the trigger conditions for obtaining enrichment data for the registered object (Operation 308). In one or more embodiments, the listening process monitors database events, such as updates and additions, to a database table (or column within the table) that stores content for the social media object. Additionally or alternatively, the listener may monitor for other triggering events as specified in the registration data. Upon detecting a triggering event, enrichment service 124 retrieves analytic metadata for the object from one or more sources.

Figure 3B:
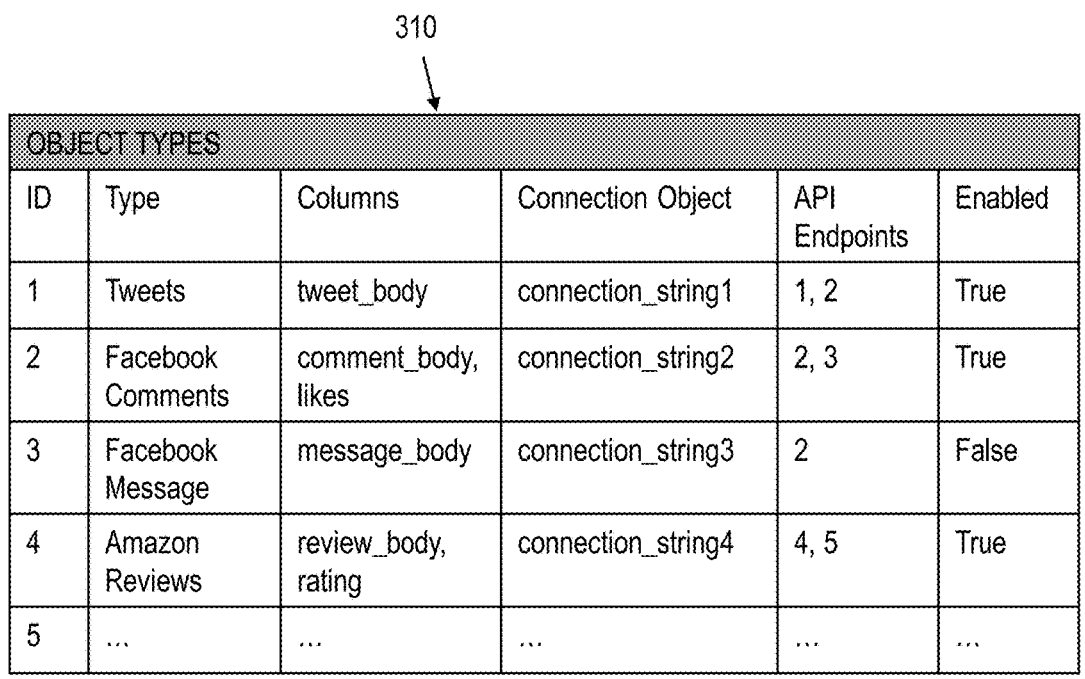
FIG. 3B illustrates an example data structure that maps object types to API endpoints in accordance with one or more embodiments.

FIG. 3B illustrates example data structure 310 that maps object types to API endpoints in accordance with one or more embodiments. Data structure 310 is a database table where the rows represent a different registered objects and the columns represent different registration attributes. Example registration attributes include an "ID" field that stores a row id of the object, a "Type" field that identifies the type of object (e.g., tweets, facebook comments, etc.), a "Columns" field that identifies database columns that should trigger an event to obtain enriched data when changed, a "Connection Object" field that includes a connection string where the object is stored (e.g., a database connection string such as "dbname=mydb user=foo password=bar host=localhost port=5432 sslmode=require", a JavaScript Object Notation (JSON) connection string, etc.), an "API Endpoint" field that maps the registered object to API endpoints for obtaining enriched data, and an "Enabled" field that indicates whether the triggers are active or inactive.

Registration data may be used to determine when and how to enrich a registered data objects. With reference to the first registered object type in data structure 310, the listening process may monitor for updates to the column "tweet_body" located in the database table linked by "connection_string1". For instance, the listening process may detect that an SRM component has added new rows to the column "tweet_body" as new tweets are received. In response to detecting a trigger condition, API endpoints 1 and 2 are invoked to obtain enrichment data for the new tweets. With reference to the second registered object type ("facebook comments"), enrichment is triggered based on changes to the "comment_body" or "likes" column. If the event a trigger is detected, enrichment service 124 uses API endpoints 2 and 3 to obtain enrichment data. Similarly, the registration data may be used to determine when and how to obtain enrichment data for facebook messages, amazon marketplace reviews, etc.

In one or more embodiments, the registration data is stored separately from the API endpoints. If API parameters are changed, then the registration data may be maintained with little or no modification. For example, if the authentication method, attribute mappings, HTTP header values, and/or other configuration parameters for an API endpoint are modified due to changes of an external sources, these parameters may be updated in the configuration data previously described. The registered objects may remain mapped to the same API endpoints without being changed. On the other hand, a user may change the object-to-source mappings in the registration data without changing the API endpoint data.

5. Object Enrichment

Figure 4A:
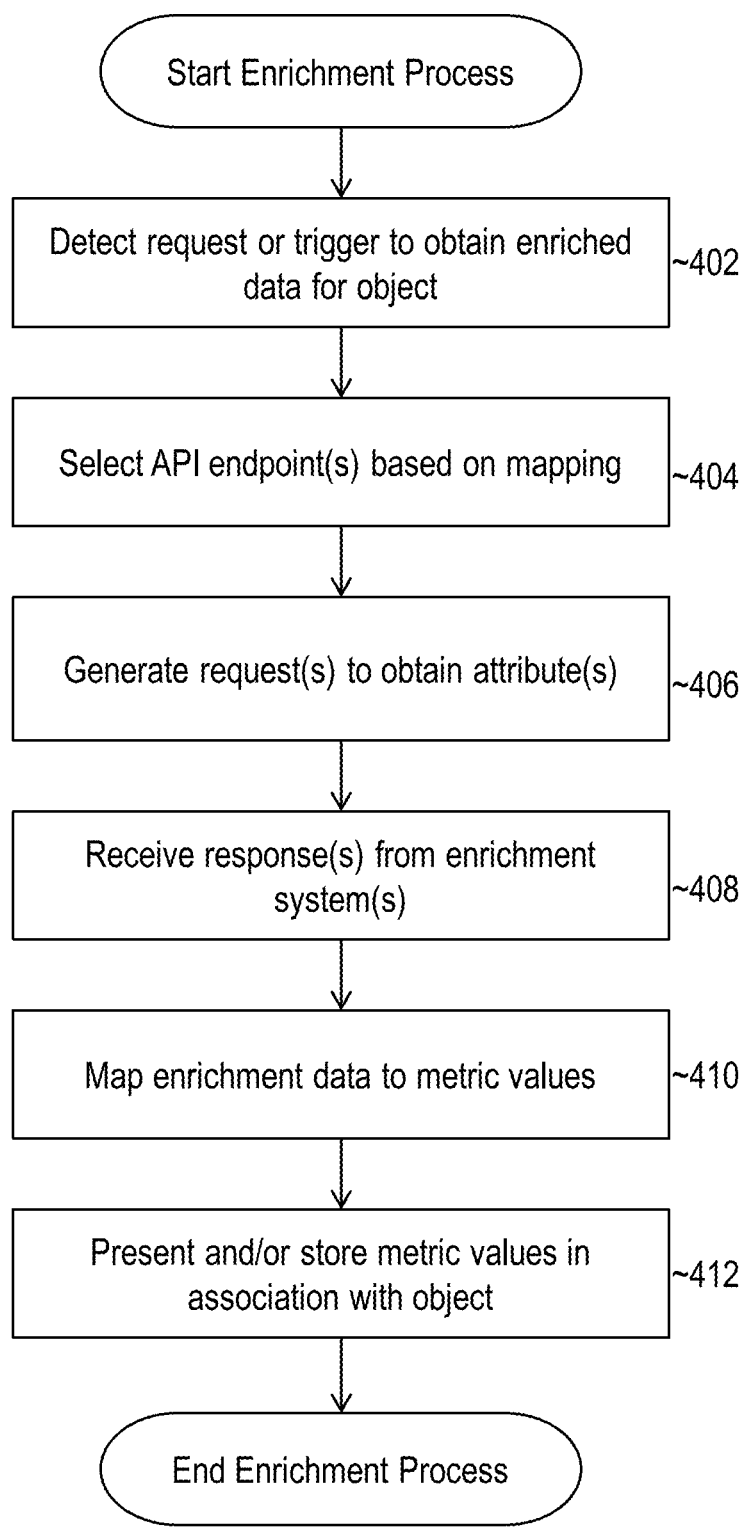
FIG. 4A illustrates an example set of operations for obtaining a set of enrichment data for an object in accordance with one or more embodiments.

FIG. 4A illustrates an example set of operations for obtaining a set of enrichment data for an object in accordance with one or more embodiments. The process begins by detecting a request or a trigger to obtain enrichment data for an object. (Operation 402). In one or more embodiments, enrichment service 124 obtains enrichment data for an object (a) on demand and in response to requests from an SRM application, and/or (b) in response to determining the trigger conditions defined in the object registration data have been satisfied.

In one or more embodiments, an SRM application may explicitly request enrichment of a social media object, even if the social media object is unregistered. As previously indicated, an SRM user may drag and drop object onto a GUI element to enrich the object. In response to dropping the object, the SRM application may generate a submit a request to messaging service 122. Enrichment service 124 may subscribe to messaging service 122 to listen for application requests for enriched data. In response to detecting the request, enrichment service 124 may obtain enriched data for the object as described further below.

In addition or as an alternative to monitoring for requests, enrichment service 124 may monitor for events that trigger object enrichment. For example, enrichment service 124 may monitor for new target content retrieved by listening service 112 for a registered object. Additionally or alternatively, enrichment service 124 may monitor for other trigger conditions as previously described.

In response to detecting a request or trigger, enrichment service 124 selects a set of API endpoints based on mapping data maintained for the object/object type (Operation 404). For example, in response to detecting new target content for a registered object, enrichment service 124 may call an API for one or more of enrichment systems 128-j to obtain analytic metadata about the new target content. Referring to the mapping data maintained in data structure 310, for instance, enrichment service 124 may select API endpoints 1 and 2 to enrich new tweets, API endpoints 2 and 3 to enrich new facebook comments, API endpoint 2 to enrich new facebook messages, etc.

Using the selected API endpoints, enrichment service 124 generates one or more API requests to obtain enrichment data from one or more plugged-in enrichment systems (Operation 406). The requests may include authentication requests per the authorization method specified in the endpoint data (e.g., Oauth 1.0, Oauth 2.0, etc.) and/or HTTP requests complying with the source API, in accordance with one or more embodiments. The requests (e.g., HTTP requests) may include the object to be enriched or may omit the object depending on the source API.

In some cases, an SRM application may request enriched data that already resides in SRM system 110. For example, enrichment service 124 may have previously retrieved enriched data in response to a prior request or triggering event. If the enrichment data already resides in data repository 126, then enrichment service 124 may fetch the data directly from data repository 126 without formulating any API requests.

In the case where API requests are sent, enrichment service 124 receives one or more responses that include the enrichment data (Operation 408). As previously indicated, the enrichment data may include metrics and/or other attributes associated with a social media object. The metrics and attributes that are included may vary depending on the object being enriched and the specialized enrichment algorithms implemented by the plugged-in sources. The metrics that are retrieved may further evolve over time as new sources are plugged into SRM system 110 and/or obsolete sources are removed.

Upon receiving the one or more responses, enrichment service 124 maps the enrichment data to metric values (Operation 410). For example, enrichment service 124 may read the attribute mapping stored in data structure 220 to determine how to parse a response message received through API endpoint "1". Based on the mapping data, the "id" value in the response message is mapped to "message_id", and the "sentiment" value is mapped to "level".

SRM system 110 then presents and/or store metric values in association with object (Operation 412). In one or more embodiments, enrichment system 124 processes the analytic data before it is presented to an end user. Examples of analytic data processing are provided in further detail below. In other embodiments, the data may be presented to an end user as received from the enrichment system without any further processing.

In one or more embodiments, enrichment system 124 posts a message via messaging service 122 when new enriched data for a registered object is received. SRM application services 118a-i may subscribe to messaging service 122 to listen for new messages including enriched data for target objects. In response to detecting a new message, one or more SRM application services may consume the enrichment data and process the data per the application logic.

FIG. 4B illustrates example data structure 420 that stores attributes extracted from enrichment data in association with an object in accordance with one or more embodiments. Data structure 420 includes a set of rows that correspond to different objects and a set of columns that store attributes extracted from messages sent by enrichment systems 128a-j. The columns include an "API Endpoint" identifying the source (or sources) of the attributes, an "Object" attribute storing a unique identifier for the object, and a set of attribute columns storing attribute values for different attributes extracted from the enrichment data. "Attribute 1" in this example corresponds to the "message_id" attribute, and "Attribute 2" measures a level of sentiment. As can be seen, the first object has a negative sentiment value "−4", and the second object has a positive sentiment of "10". The attributes that are stored may vary from implementation to implementation based on the defined attribute mapping. Example attributes are provided in the sections above.

6. Analytic Data Processing

As previously mentioned, data processing engine 120 may normalize data, combine metrics, and/or apply user-provided logic to attributes collected from different sources. In one or more embodiments, data processing engine 120 comprises a set of one or more background processes that combine or otherwise process enriched data before it is consumed by an SRM application. In other embodiments, the enriched data may be provided directly to the SRM application without performing any processing in the background.

In one or more embodiments, data processing engine 120 is configured to apply a set of weights to attribute values extracted from enriched object data. Weights may be assigned based on object type, source, source endpoint, and/or attribute, depending on the particular implementation. For example, Twitter_api in data structure 210 may have a greater weight than BlueKai_api or vice versa. As another example, "demo_enrich" may have a greater weight than "sales_enrich". In yet another example "attribute_2" in data structure 220 may have a greater weight than "attribute_1".

Weights may be stored in any of the data structures previously described and/or in a separate mapping table. For example, weights assigned based on API endpoints may be stored in data structure 210, weights assigned based on attributes may be stored in data structure 220, and weights assigned by object type may be stored in data structure 310. As another example, tuples may be associated with weights.

For instance, {object type, API 1 (0.3), API 2 (0.7)} may be defined to assign a weight of "0.3" to "API 1" and a weight of "0.7" to "API 2".

Weights may be applied to metric values by multiplication, division, addition, division and/or any other weighting formula. In the context of multiplication, for instance, if a level of sentiment of "10" is extracted from a source associated with a weight of "0.7", then a weighted value of "7" may be assigned to the attribute. Weights may be applied to normalize data, indicate a level of relevance (for instance twitter enrichment data may be more relevant to an SRM application than another SRM application), and/or indicate a level of reliability (for instance one source of enrichment data may be more reliable than another).

In one or more embodiments, data processing engine 120 is configured to combine weighted metrics retrieved from various sources. Weighted metrics may be combined using any formula, which may be predefined by SRM system 110 or received from an SRM user. For example, weighted metrics may be added, multiplied, averaged, etc.

In one or more embodiments, data processing engine 120 may combine metrics of the same type obtained from different sources. For example, two or more enrichment systems may return a level of sentiment associated with a post using different specialized algorithms. Data processing engine 120 may apply weights to each sentiment value and sum (or average) the values together to get a combined level of sentiment score across different sources.

In one or more embodiments, data processing engine 120 may combine different types of metrics. For example, data processing engine 120 may apply a formula that combines a level of sentiment value with a level of engagement value to generate a combined score for the object. The weights may be applied to the different attribute values to normalize the different attributes before the attributes values are combined. The combined score may be used to determine an overall level of priority for a post. For instance, objects exhibiting high levels of sentiment and engagement may have the highest priority score, whereas objects exhibiting low levels of sentiment and engagement may have a low priority score. In other cases, objects exhibiting low levels of sentiment and high levels of engagement may be given the highest priority score. Sentiment and engagement may be weighted differently to give more influence to attributes that are more relevant to a given application. For example, sentiment may be weighted lower than engagement if engagement plays a greater factor in whether an SRM application should respond to a social media post.

In one or more embodiments, data processing engine 120 is configured to combine confidence scores associated with metrics. A confidence score is a measure that a metric is likely accurate. For instance, there may be a 70% probability that a consumer prefers a certain sports team based on zip code information associated with the consumer. An enrichment system may return the predicted preference and the 70% confidence score to indicate the level of uncertainty. Another source may predict that the consumer prefers the sports team with a 90% confidence score. The confidence scores may be averaged to 80% or combined in any other way to indicate a combined confidence score.

In one or more embodiments, a set of one or more analytic results may be stored and/or presented in association with an object based on combined metrics. In the example, where objects exhibiting high levels of sentiment and engagement may have the highest combined score, for instance, data processing engine 120 may recommend that an SRM user respond to the object (e.g., through a GUI or another interface). In other cases, the combined score may automatically trigger an automated response message posted via publishing service 114 on one or more communication channels. Other responsive actions may include, but are not limited to, presenting recommended content to use in response to an automated post, adjusting marketing activities, presenting marketing leads, triggering automated services, and presenting campaign results. The analytic results may thus be used to facilitate and improve the effectiveness of SCS interactions of communication channels 104.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates computer system 500 upon which one or more embodiments may be implemented. Computer system 500 includes bus 502 or other communication mechanism for communicating information, and hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT), liquid crystal display (LCD), or light-emitting diode (LED), for displaying information to a computer user. Input device 514, which may include physical and/or touchscreen based alphanumeric keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to host computer 524 or to data equipment operated by Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Miscellaneous: Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which, when executed by one or more hardware processors, cause performance of operations comprising:
   storing, by a social media management application, a set of interface endpoints wherein each of the interface endpoints comprises a location and a specified method for invoking a service to obtain metadata about one or more social media objects;
   storing, by the social media management application, a set of mappings between social media object types and interface endpoints in the set of interface endpoints;

receiving, by the social media management application, a social media object having a particular social media object type of a plurality of different social media object types;

identifying, by the social media management application within the set of mappings, a mapping between the particular social media object type and at least one interface endpoint in the set of interface endpoints;

using, by the social media management application, the at least one interface endpoint to obtain, from one or more sources of metadata, a set of one or more metrics relevant to the social media object, wherein the set of one or more metrics are associated with a set of one or more uncertainty values;

generating, by the social media management application, a score for the social media object based, at least in part, on the set of one or more metrics and the set of one or more uncertainty values; and triggering, by the social media management application, an automated response to the social media object based, at least in part, on the score.

2. The one or more non-transitory computer-readable media of claim 1, the operations further comprising identifying a set of one or more weights associated with at least one of the particular social media object type or the at least one interface endpoint; generating a weighted score by applying the set of one or more weights to the set of one or more metrics; and storing or presenting the weighted score in association with the social media object.

3. The one or more non-transitory computer-readable media of claim 2, the operations further comprising performing at least one of presenting a recommended action in association with the social media object or triggering an action in association with the social media object based on the weighted score.

4. The one or more non-transitory computer-readable media of claim 1, wherein instructions for storing a set of mappings between social media object types and interface endpoints in the set of interface endpoints comprises instructions for storing a set of tuples, each tuple including a respective social media object type and one or more interface endpoints.

5. The one or more non-transitory computer-readable media of claim 1, wherein the instructions further cause operations comprising registering the social media object for metric tracking to obtain a registered social media object; detecting an event that updates the registered social media object, responsive to detecting the event, obtaining, using the at least one interface endpoint, a second set of one or more metrics relevant to the social media object; and storing or presenting the second set of one or more metrics in association with the registered social media object.

6. The one or more non-transitory computer-readable media of claim 5, wherein the event is one of a new content posted on a social media channel, edited content on the social media channel, or a reply to a comment on a social media channel.

7. The one or more non-transitory computer-readable media of claim 1, wherein the social media object is one of a social media post or a social media handle.

8. The one or more non-transitory computer-readable media of claim 1, wherein the plurality of social media object types includes a first social media object type representing content posted on a first social media channel and a second social media object type representing content posted on a second social media channel.

9. The one or more non-transitory computer-readable media of claim 1, wherein the interface endpoints are different application programming interface (API) endpoints and wherein obtaining, from one or more sources using the at least one endpoint, a set of one or more metrics relevant to the social media object comprises invoking one or more APIs based on the particular social media object type.

10. A computer-implemented method executed by one or more hardware processors comprising:

storing, by a social media management application, a set of interface endpoints wherein each of the interface endpoints comprises a location and a specified method for invoking a service to obtain metadata about one or more social media objects;

storing, by the social media management application, a set of mappings between social media object types and interface endpoints in the set of interface endpoints;

receiving, by the social media management application, a social media object having a particular social media object type of a plurality of different social media object types;

identifying, by the social media management application within the set of mappings, a mapping between the particular social media object type and at least one interface endpoint in the set of interface endpoints;

using, by the social media management application, the at least one interface endpoint to obtain, from one or more sources of metadata, a set of one or more metrics relevant to the social media object, wherein the set of one or more metrics are associated with a set of one or more uncertainty values;

generating, by the social media management application, a score for the social media object based, at least in part, on the set of one or more metrics and the set of one or more uncertainty values; and triggering, by the social media management application, an automated response to the social media object based, at least in part, on the score.

11. The computer implemented method of claim 10, further comprising identifying a set of one or more weights associated with at least one of the particular social media object type or the at least one interface endpoint; generating a weighted score by applying the set of one or more weights to the set of one or more metrics; and storing or presenting the weighted score in association with the social media object.

12. The computer implemented method of claim 11, further comprising performing at least one of presenting a recommended action in association with the social media object or triggering an action in association with the social media object based on the weighted score.

13. The method of claim 10, wherein storing a set of mappings between social media object types and interface endpoints in the set of interface endpoints comprises storing a set of tuples, each tuple including a respective social media object type and one or more interface endpoints.

14. The method of claim 10, further comprising registering the social media object for metric tracking to obtain a registered social media object; detecting an event that updates the registered social media object, responsive to detecting the event, obtaining, using the at least one interface endpoint, a second set of one or more metrics relevant to the social media object; and storing or presenting the second set of one or more metrics in association with the registered social media object.

15. The method of claim 14, wherein the event is one of a new content posted on a social media channel, edited content on the social media channel, or a reply to a comment on a social media channel.

16. The method of claim 10, wherein the social media object is one of a social media post or a social media handle.

17. The method of claim 10, wherein the plurality of social media object types includes a first social media object type representing content posted on a first social media channel and a second social media object type representing content posted on a second social media channel.

18. The method of claim 10, wherein the interface endpoints are different application programming interface (API) endpoints and wherein obtaining, from one or more sources using the at least one endpoint, a set of one or more metrics relevant to the social media object comprises invoking one or more APIs based on the particular social media object type.

19. A system comprising:
one or more hardware processors;
one or more non-transitory computer-readable media storing instructions, which when executed by the one or more hardware processors cause operations comprising:
storing, by a social media management application, a set of interface endpoints wherein each of the interface endpoints comprises a location and a specified method for invoking a service to obtain metadata about one or more social media objects;
storing, by the social media management application, a set of mappings between social media object types and interface endpoints in the set of interface endpoints;
receiving, by the social media management application, a social media object having a particular social media object type of a plurality of different social media object types;
identifying, by the social media management application within the set of mappings, a mapping between the particular social media object type and at least one interface endpoint in the set of interface endpoints;
using, by the social media management application, the at least one interface endpoint to obtain, from one or more sources of metadata, a set of one or more metrics relevant to the social media object, wherein the set of one or more metrics are associated with a set of one or more uncertainty values;
generating, by the social media management application, a score for the social media object based, at least in part, on the set of one or more metrics and the set of one or more uncertainty values; and
triggering, by the social media management application, an automated response to the social media object based, at least in part, on the score.

20. The system of claim 19, wherein the interface endpoints are different application programming interface (API) endpoints and wherein obtaining, from one or more sources using the at least one endpoint, a set of one or more metrics relevant to the social media object comprises invoking one or more APIs based on the particular social media object type.

* * * * *

UNITED STATES PATENT AND TRADEMARK OFFICE
CERTIFICATE OF CORRECTION

PATENT NO. : 10,380,610 B2
APPLICATION NO. : 15/385621
DATED : August 13, 2019
INVENTOR(S) : You et al.

It is certified that error appears in the above-identified patent and that said Letters Patent is hereby corrected as shown below:

In the Specification

In Column 10, Line 15, delete "system." and insert -- system, --, therefor.

In Column 18, Line 30, delete "Miscellaneous:" and insert -- Miscellaneous; --, therefor.

Signed and Sealed this
Fourth Day of August, 2020

Andrei Iancu
*Director of the United States Patent and Trademark Office*